United States Patent
Wildman

(10) Patent No.: US 6,802,429 B1
(45) Date of Patent: Oct. 12, 2004

(54) FLOATING LID ASSEMBLY FOR A STEAM KETTLE

(75) Inventor: Andrew Eric Wildman, Urbana, OH (US)

(73) Assignee: Premark FEG L.L.C., Wilmington, DE (US)

( * ) Notice: Subject to any disclaimer, the term of this patent is extended or adjusted under 35 U.S.C. 154(b) by 60 days.

(21) Appl. No.: 09/648,020

(22) Filed: Aug. 25, 2000

(51) Int. Cl.[7] ............... A47J 36/10; A47J 36/12; B65D 43/16; B65D 45/28

(52) U.S. Cl. ............... 220/314; 220/244; 220/366.1; 220/573.1; 220/845

(58) Field of Search ............... 220/314, 573.1, 220/244, 366.1, 243, 318, 810, 845, 203.01, 756, 203.09, 203.1, 203.23, 203.27, 203.29, 768

(56) References Cited

U.S. PATENT DOCUMENTS

| | | | | |
|---|---|---|---|---|
| 3,365,096 A | * | 1/1968 | Muehl | 220/314 |
| 3,570,704 A | * | 3/1971 | Roson | 220/203.02 |
| 3,632,014 A | * | 1/1972 | Basile | 220/203.29 |
| 3,744,670 A | * | 7/1973 | De Frees | 220/314 |
| D253,348 S | * | 11/1979 | Bardeau | D7/347 |
| 4,181,238 A | * | 1/1980 | Arnold et al. | 220/314 |
| 4,201,312 A | * | 5/1980 | Basile | 220/314 |
| 4,498,695 A | * | 2/1985 | Pardo | 292/260 |
| 4,501,377 A | * | 2/1985 | Palmer, III | 105/377.07 |
| 4,746,030 A | * | 5/1988 | Gabriele et al. | 220/316 |
| 4,847,949 A | * | 7/1989 | Goad et al. | 16/252 |
| 4,889,056 A | * | 12/1989 | Stewart | 105/377.11 |
| 5,065,887 A | * | 11/1991 | Schuh et al. | 220/835 |
| 5,967,358 A | * | 10/1999 | Adams et al. | 105/377.05 |
| 6,019,029 A | * | 2/2000 | Chan | 220/293 |
| 6,244,457 B1 | * | 6/2001 | Piotrowski et al. | 220/314 |
| 6,257,124 B1 | * | 7/2001 | Chen | 220/314 |

OTHER PUBLICATIONS

Vulcan–Hart Company, "Operating, Maintenance and Parts Manual Direct Steam Heated Steam Jacketed Kettles All Models, SS, SL & ST Series", Front page and pp. 7–8.
"Parts List: Spring Assisted Hinge Assembly (Optional)", p. 12.

* cited by examiner

Primary Examiner—Nathan J. Newhouse
Assistant Examiner—Niki Eloshway
(74) Attorney, Agent, or Firm—Thompson Hine LLP

(57) ABSTRACT

A steam kettle lid assembly includes an elongated arm movable between an up position and a down position. A steam kettle lid includes central portion non-rotatingly attached to the arm in a manner which permits floating movement of the lid for proper seating on a kettle opening, but which also prevents a condensate rim on a bottom portion of the lid from rotating out of its functional position.

4 Claims, 4 Drawing Sheets

FLOATING LID ASSEMBLY FOR A STEAM KETTLE

FIELD OF THE INVENTION

The present invention relates generally to steam kettles utilized in commercial kitchens, and more particularly, to a floating lid construction for steam kettles which prevents undesirable rotation of the kettle lid.

BACKGROUND OF THE INVENTION

Large commercial steam kettles are commonly used in large scale cooking operations and may include a large lid which is movable between a raised position for providing access to the contents of the kettle and a lowered position for sealingly covering the open top of the kettle. In order to provide suitable positioning of the kettle lid, the use of a floating attachment of a movable arm to a center of the kettle lid has been provided in the past by providing a ball and socket type attachment structure between the arm and lid. Unfortunately, such floating center attachments have resulted in a kettle lid which is rotatable. As a result, condensate rings or rims positioned on the inner surface of the kettle lids can rotate out of their functional positions.

Accordingly, it would be desirable and advantageous to provide a floating kettle lid assembly which also prevents rotation of the kettle lid in order to maintain proper rotational positioning of the kettle lid condensate ring.

SUMMARY OF THE INVENTION

In one aspect of the present invention, a lid assembly includes an elongated arm movable between an upward position and a downward position and a lid including a condensate rim extending from a lower surface thereof and positioned toward a first side of the lid. One of the arm and the lid includes a female coupling member extending therefrom which has both a coupling opening therein and a fastener receiving opening therein. The other of the arm and the lid includes a male coupling member extending therefrom and having a fastener receiving opening therein. The male coupling member is positioned within the coupling opening of the female coupling member such that the fastener receiving opening of the female coupling member is aligned with the fastener receiving opening of the male coupling member. A fastener passes through the aligned fastener receiving openings for coupling the male coupling member to the female coupling member and for preventing rotational movement of the lid. A size of the fastener is smaller than a size of the fastener receiving opening of the male coupling member to permit floating movement of the lid. Thus, the male coupling member, female coupling member, and fastener arrangement permits a floating movement of the kettle lid to provide a desired sealing positioning atop a steam kettle while also preventing rotational movement of the lid relative to the kettle to thereby prevent the condensate rim from moving out of its functional position. Preferably, the male coupling member is a boss which extends from the arm, the female coupling member is a projection which extends from the center of the upper surface of the lid, and the fastener is a pin.

Another aspect of the invention provides a steam kettle lid assembly including an elongated arm and a steam kettle lid having a central portion, a first side portion, a top, and a bottom. The central portion of the lid is non-rotatably coupled to the arm at an intermediate point along the arm. A condensate rim extends from the bottom of the lid along at least the first side portion of the lid. The arm includes a portion extending outward beyond a perimeter of the lid at the first side portion of the lid, such portion being pivoted to permit movement of the lid between a down position in which the lid is substantially horizontal and an up position in which the lid is angled relative to the horizontal. The first side portion of the lid, including the condensate rim, is located below the central portion of the lid when the lid is in the up position for allowing condensate on the bottom of the lid to run downward toward the condensate rim.

Still another aspect of the invention provides a method of attaching a steam kettle lid for movement between an open position relative to an opening of a steam kettle and a closed position relative the opening of the steam kettle, wherein the method involves providing an arm movable between an upward position and a downward position and providing a lid. A female coupling member is provided on one of the arm and the lid and a male coupling member is provided on the other of the arm and the lid. The female coupling member is connected to the male coupling member in a manner which permits floating movement of the lid relative to the arm, but prevents rotational movement of the lid.

DETAILED DESCRIPTION OF THE EMBODIMENTS

Figure 1:
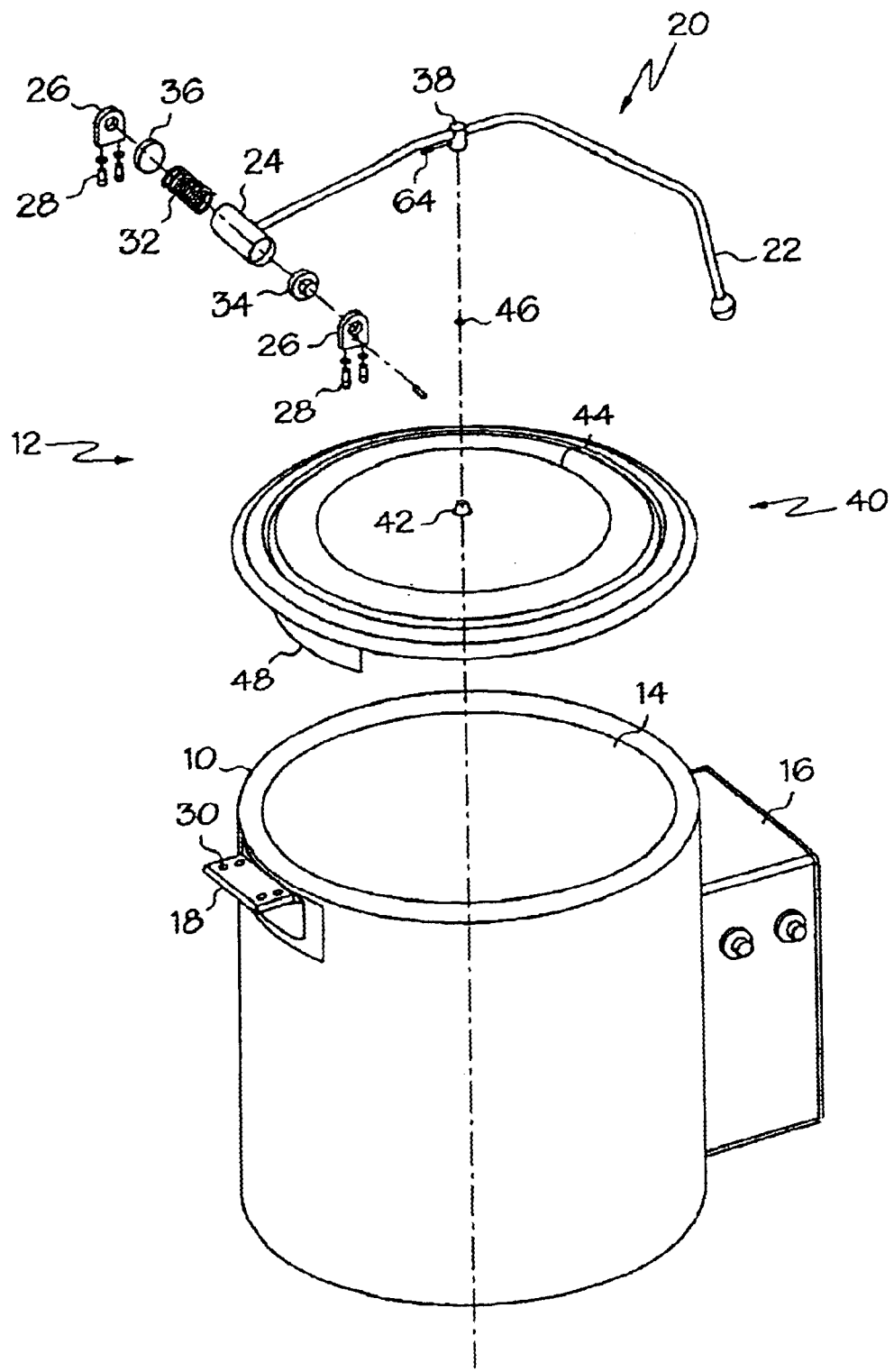
FIG. 1 is an exploded perspective view of a steam kettle and lid assembly.
Figure 2:
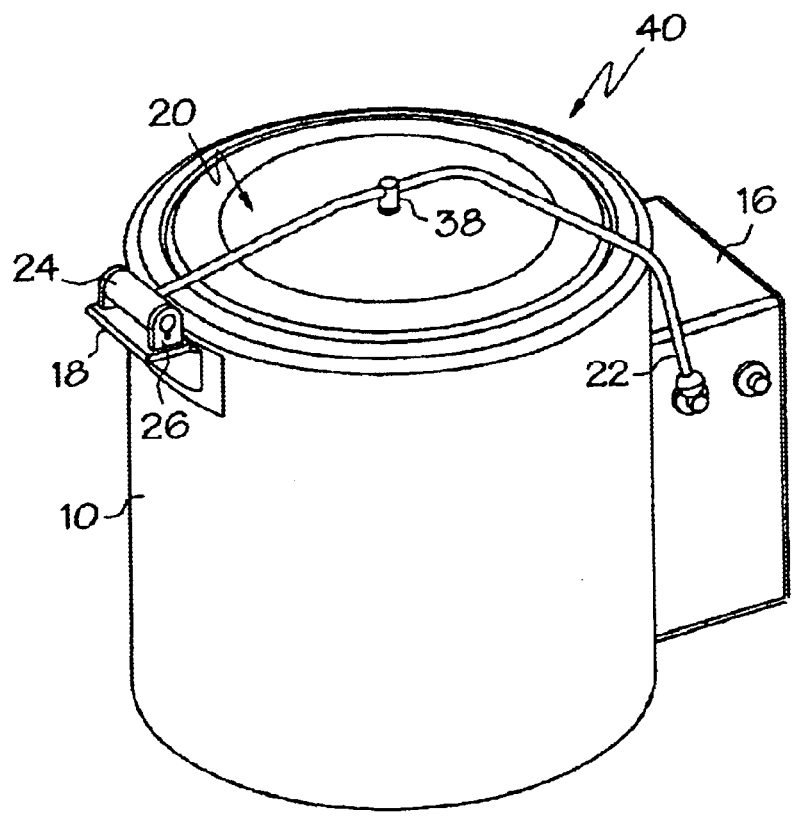
FIG. 2 is an assembled view of the steam kettle and lid assembly of FIG. 1.
Figure 9:
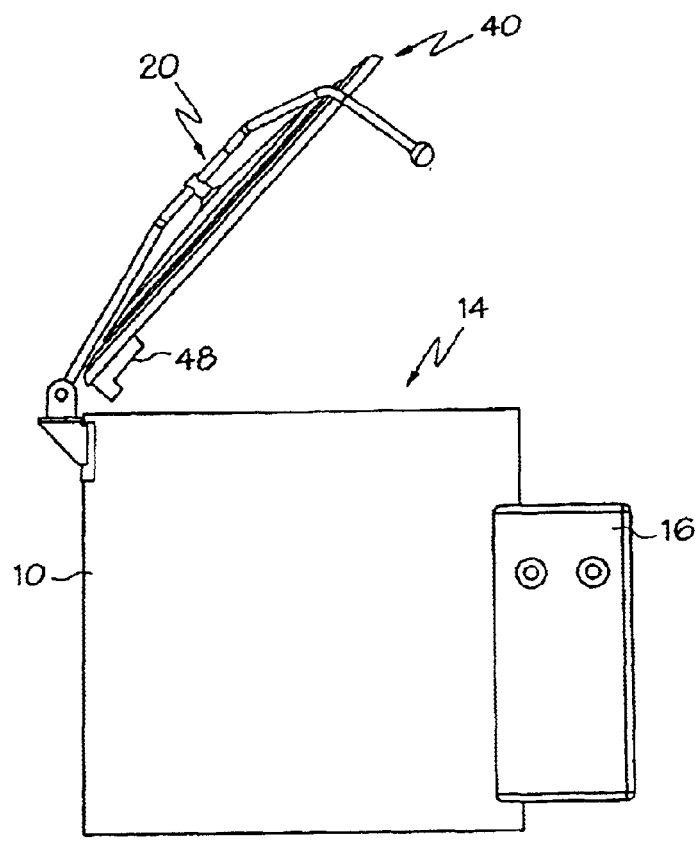
FIG. 9 shows the steam kettle assembly with arm and lid in an upward position.
Figure 10:
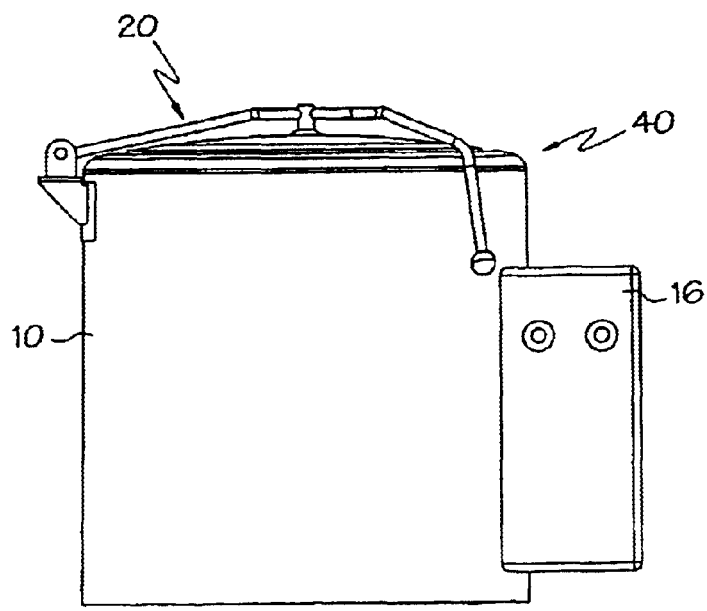
FIG. 10 shows the steam kettle assembly with arm and lid in a downward position.

Referring to drawing FIGS. 1 and 2, exploded and assembled perspective views of a steam kettle 10 including a lid assembly 12 according to one embodiment of the present invention are shown. The steam kettle 10 includes an upper opening 14 for receiving food product to be cooked, a side mounted control box 16, and a side mounted bracket 18 for connection of the lid assembly 12. The lid assembly includes an elongated arm 20 having a handle portion 22 at one end which extends over the side of the steam kettle 10. The opposite end of arm 20 extends outward beyond the perimeter of the lid 40 and includes a cylindrical coupling member 24 for pivotably mounting the arm 20 to the bracket 18. In this regard, side plates 26 are provided for connection to the bracket 18 via fasteners 28 which pass through slots 30 in the bracket 18. A torsion spring 32 is sized for insertion into cylindrical coupling member 24 and a tension adjustment disc 34 and rotary stop disc 36 are provided at the ends of the member 24. When assembled to the bracket 18, the arm member is then pivotably movable between an upward position (FIG. 9) and a downward position (FIG. 10) relative to the steam kettle opening 14. When in the downward position the lid 40 is substantially horizontal for seating on the kettle opening. When in the upward position the slide 40 is angled relative to the horizontal.

A female coupling member 38 having an opening therein is positioned at an intermediate point along the arm 20 for connecting the kettle lid 40 to the arm 20. In particular, the kettle lid 40 includes a centrally located male coupling member 42 extending from its upper surface 44 and sized for positioning within the opening of the female coupling member. An o-ring 46 is preferably positioned around the male coupling member 42 prior to connection with the female coupling member 38. Also partially visible is the condensate rim 48 which extends downward from the lower surface of the lid 40 at the side of the lid which is located near the bracket 18. When the lid is pivoted upward and water which has condensed on the inner surface of the lid runs downward the condensate rim directs such condensate back into the opening 14 of the steam kettle 10. However, as noted previously, if the lid 40 is permitted to rotate, the condensate rim 48 may rotate out of its functional position. As described below, the connection of the arm 20 to lid 40 provided herein prevents such undesirable rotation of the lid 40 and mispositioning of the condensate rim 48.

Figure 3:
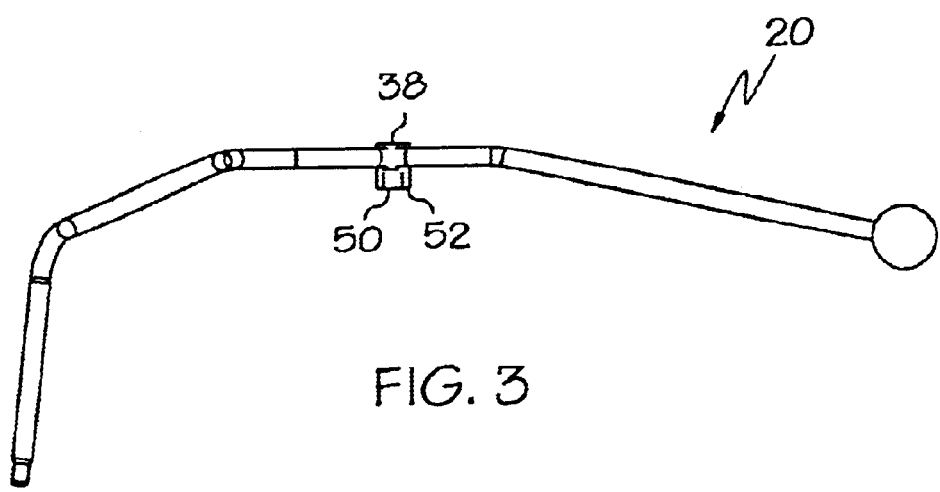
FIG. 3 is a side view of the arm of the lid assembly of FIG. 1.
Figure 4:
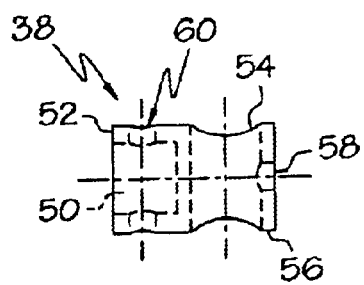
FIG. 4 is a first side view of the coupling member associated with the arm of FIG. 3.
Figure 5:
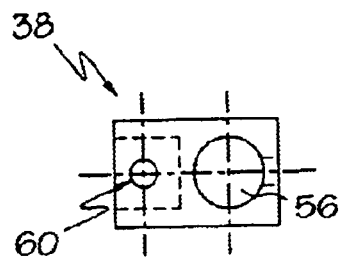
FIG. 5 is a second side view of the coupling member associated with the arm of FIG. 3.
Figure 6:
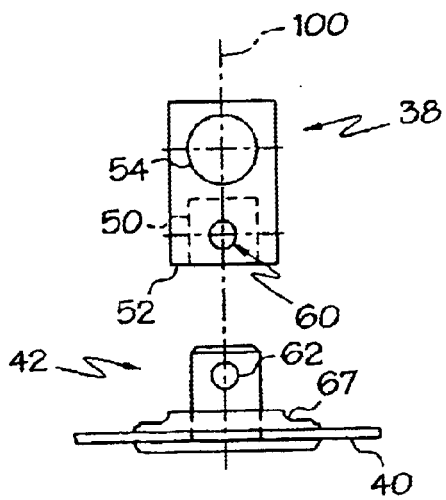
FIG. 6 is a side elevation of the coupling member of the lid of FIG. 1 in spaced apart relationship to the arm coupling member.

In particular, as shown in FIGS. 3–5, the female coupling member 38 includes an opening 50 at its bottom edge 52 for receiving the male coupling member 42, forming a boss-like extension from the arm 20. An opening 54 toward upper side 56 of the coupling member 38 is provided and the arm 20 passes through such opening 54. An upper opening 58 may be provided for receiving a fastener such as a screw which locks the coupling member 38 in place along the arm 38. A fastener receiving opening 60 is formed through the side of the coupling member 38 and has an axis which extends across the opening 50. Similarly, as shown in FIG. 6, the male coupling member 42 which forms a projection extending upward from lid surface 44 also includes a fastener receiving opening 62. The opening 62 aligns with the fastener receiving opening 60 when member 42 is positioned within coupling opening 50 of female coupling member 38. Such alignment preferably places end surface 52 in spaced apart relation to an end surface 66 defined by a nut 67 placed around the stud portion of male coupling member 42 which extends through an opening in lid 40. The axes of both openings 60 and 62 are parallel to the axis of arm receiving opening 54.

Figure 7:
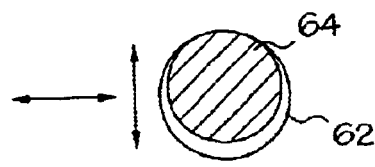
FIG. 7 is a view depicting the relative size of the fastener receiving opening of the lid coupling member and the fastener passing through such opening.

A fastener 64 (FIG. 1) such as a pin passes through the aligned openings 60 and 62 and locks the two coupling members 38 and 42 together in a non-rotating fashion. The pin 64 may be sized for a frictional fit with the opening 60 in female coupling member 38 to secure the pin 64 in place upon assembly. Importantly, the diameter of opening 62 is selected larger than the diameter of the pin 64 as shown in FIG. 7 such that the coupling member 42 and lid 40 attached thereto are capable of slight, floating movement relative to the female coupling member 38 and arm 20. As used herein the term "floating movement" refers to the ability of the lid to move relative to the arm 20 a sufficient amount to be properly seated on a kettle. Preferably, the lid is capable of movement in all radial directions relative to a central attachment axis 100 of the arm coupling member 38, and is also capable of moving slightly up and down relative to the arm 20 and at least slightly angularly relative to the arm 20. Opening 50 in coupling member 38 is sized slightly larger than the upper, stud projection portion of the coupling member 42 to also facilitate such floating movement. Thus, the pin 64 prevents significant rotational movement of the lid 40 relative to the arm 20 to maintain the condensate rim 48 in its functional position, but still permits floating movement of the lid to aid in proper lid positioning on the opening 14 of the steam kettle 10. As used herein the terms "non-rotating" and "non-rotational" when used to refer to the lid and/or lid to arm attachment structure are intended to encompass lids or attachment structures which rotate up to several degrees, but which do not rotate far enough to permit the lid condensate rim to move out of its functional position.

Figure 8:
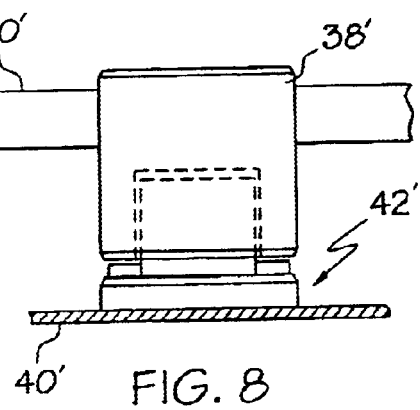
FIG. 8 is a partial cross-sectional view of an alternate attachment scheme for the lid coupling member.

Although the invention has been described and illustrated in detail it is to be clearly understood that the same is intended by way of illustration and example only and is not intended to be taken by way of limitation. For example, while female coupling member 38 is shown positioned on arm 20 and male coupling member 42 is shown positioned on lid 40, it is recognized and anticipated that such positioning could be reversed. Further, while the use of a pin 64 as a fastener for connecting the two coupling members is preferred, other types of fasteners could be utilized. For example, a threaded fastener which threadedly engages the opening 60 might be used. Still further, while coupling member 42 may pass through an opening in the lid, alternative attachment schemes could be utilized, such as by welding the coupling member 42 to a top surface of the lid as shown in FIG. 8 where arm 20' and coupling member 38' are shown, with coupling member 42' attached to an upper surface of the lid 40'. Other floating, non-rotating center attachment schemes could also be used.

Accordingly, the spirit and scope of the invention are to be limited only by the terms of the appended claims.

What is claimed is:

1. A steam kettle lid assembly, comprising:

an elongated arm movable between an upward position and a downward position, a downwardly extending boss positioned at an intermediate point along the arm, the boss including a pin receiving opening therein, the arm having a first end located away from the boss;

a lid including a centrally positioned projection extending from an upper surface thereof, the projection including a pin receiving opening therein, the projection positioned within the boss of the elongated arm with the pin receiving opening of the boss aligned with the pin receiving opening of the projection, the lid including a condensate rim extending from a lower surface thereof and positioned toward a first side of the lid;

a pin passing through the aligned pin receiving openings for coupling the projection to the boss and for preventing significant rotational movement of the lid so as to maintain a desired rotational position of the condensate rim relative to the first end of the arm; and wherein a cross-sectional size of the pin is smaller than a size of the pin receiving opening of the projection so that some spacing is provided between the pin and the pin receiving opening thereby enabling movement of the projection and the lid in multiple directions relative to the pin, where such movement includes movement other than pivotal movement about the pin;

wherein the lid includes a through hole and the projection comprises a portion of a member which extends through the through hole.

2. The steam kettle lid assembly of claim 1 wherein the elongated arm includes a pivoting connection at the first end for permitting movement thereof.

3. The steam kettle lid assembly of claim 1 wherein an end surface of the boss is spaced from the upper surface of the lid.

4. A steam kettle lid assembly, comprising:

an elongated arm movable between an upward position and a downward position, a downwardly extending boss positioned at an intermediate point along the arm, the boss including a pin receiving opening therein, the arm having a first end located away from the boss;

a lid including a centrally positioned projection extending from an upper surface thereof, the projection including a pin receiving opening therein, the projection positioned within the boss of the elongated arm with the pin receiving opening of the boss aligned with the pin receiving opening of the projection, the lid including a condensate rim extending from a lower surface thereof and positioned toward a first side of the lid;

a pin passing through the aligned pin receiving openings for coupling the projection to the boss and for preventing significant rotational movement of the lid so as to maintain a desired rotational position of the condensate rim relative to the first end of the arm; and wherein a cross-sectional size of the pin is smaller than a size of the pin receiving opening of the projection so that some spacing is provided between the pin and the pin receiving opening thereby enabling movement of the projection and the lid in multiple directions relative to the pin, where such movement includes movement other than pivotal movement about the pin;

wherein the boss includes an opening through which the arm passes for securing the boss to the arm.

\* \* \* \* \*